United States Patent [19]

Hamerl

[11] 3,989,276

[45] Nov. 2, 1976

[54] JACK STAND

[76] Inventor: Arthur J. Hamerl, 336 Trafford Drive, NW., Calgary, Alberta, Canada

[22] Filed: May 19, 1975

[21] Appl. No.: 578,636

[52] U.S. Cl. ............................. 280/763; 280/475
[51] Int. Cl.² ........................................ B60S 9/04
[58] Field of Search .................... 280/475, 763, 764

[56] References Cited
UNITED STATES PATENTS

| | | | |
|---|---|---|---|
| 1,857,611 | 5/1932 | Sivift ............................... | 280/150.5 |
| 2,196,510 | 4/1940 | Untz ............................ | 280/150.5 X |
| 3,093,362 | 6/1963 | Schaefer ...................... | 280/150.5 X |

*Primary Examiner*—M. H. Wood, Jr.
*Assistant Examiner*—R. Schrecengost
*Attorney, Agent, or Firm*—Stanley G. Ade

[57] ABSTRACT

A mounting plate enables the stand to be mounted to any standard hitch bar. A front leg is pivoted by the upper end thereof to the front of the plate and extends downwardly and rearwardly thereof, terminating in a curved ground engaging skid. Over-center linkage is pivoted between the skid and the mounting plate extending upwardly and rearwardly towards said mounting plate when in the extended position. A lever action makes or breaks the over-center linkage thereby extending or retracting the jack stand.

3 Claims, 4 Drawing Figures

JACK STAND

BACKGROUND OF THE INVENTION

This invention relates to new and useful improvements in jack stands which although primarily designed for use with farm implements, nevertheless can readily be adapted for use with trailers or the like towed behind cars or trucks.

In these instances, the draw bar is relatively close to the ground and is usually within 14 to 16 inches when in the horizontal position.

Relatively complicated screw jack type stands are well known but these are slow in operation and usually terminate in a ground engaging wheel. Where a wheel is useful on relatively hard surfaces, nevertheless it is not practical to use a wheel on farm implements which may be on rough or cultivated ground.

When a tractor or the like backs up to a farm implement supported by a conventional jack, it is necessary that the tractor is in perfect alignment with the implement otherwise, if the tractor hitch engages the draw bar, the wheel is pushed sideways and this action often damages the jack stand particularly when on rough ground.

SUMMARY OF THE INVENTION

The present invention overcomes these disadvantages firstly by providing a curved skid plate for ground engagement and secondly for providing a jack stand which can be raised or lowered readily and easily and without the use of screw jack components and the like thus making a relatively simplified structure easily operated either by automatic means or manually from adjacent the tractor seat.

The principal object and essence of the invention is therefore to provide a device of the character herewithin described which can readily be attached to a standard hitch bar just rearwardly of the hitch bar and which is adapted to support the hitch bar in a position substantially parallel to the ground, when in the extended position Another object of the invention is to provide a device of the character herewith described which includes means for raising and lowering the jack stand from a stored position to a ground engaging position and vice versa, merely by operating a simple manual or automatic trip mechanism.

Still another object of the invention is to provide a device of the character herewithin described which includes overcenter locking action for holding a jack stand in the extended position and which furthermore is easily released for moving the jack stand to the stored position.

Yet another object of the invention is to provide a device of the character herewith described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
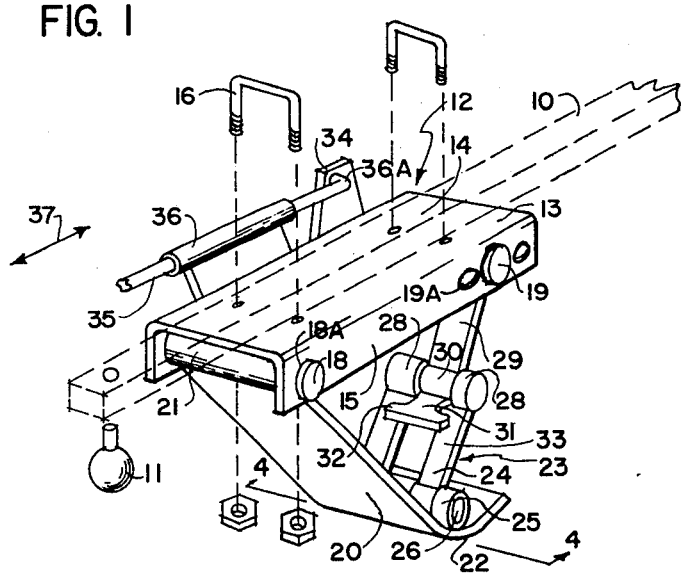
FIG. 1 is an isometric view of the device in the extended position.

Proceeding therefore to describe the invention in detail, reference character 2 shows an elongated substantially rectangular cross sectioned hitch bar having a hitch 11 on the forward end thereof, said hitch being conventional in construction.

The invention collectively designated 12 includes a mounting plate component 13 comprising a relatively short length of channel having a web 14 and a pair of downwardly depending spaced and parallel flanges 15 each one of which extends from the side edges of the web 14.

This is adapted to engage under the hitch bar 10 and to be secured thereto by means of U bolts and nut assemblies 16 in the usual manner.

The depth of the side flanges 15 is sufficient so that front and rear pivot pins 18 and 19 respectively can extend through apertures 18A and 19A formed in the side flanges.

A ground engaging skid plate 20 is provided with a bearing sleeve 21 on the upper end thereof bearably engaging around the front pivot pin 18 and this skid plate extends downwardly and rearwardly from the front pivot pin 18 and terminates in an arcuately curved ground engaging lower end 22.

Figure 2:
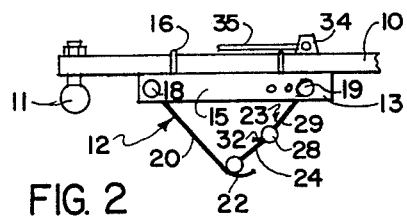
FIG. 2 is a schematic side elevation of the device in the extended position reduced in scale with respect to FIG. 1.

An over-center action collectively designated 23 extends from adjacent the lower end of the skid plate 20 to the rear pivot pin 19 thus forming, when in the extending position shown in FIGS. 1 and 2, a triangular configuration with the mounting plate component 12.

Figure 4:
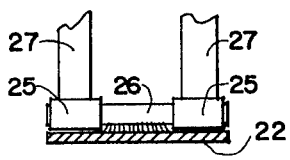
FIG. 4 is a cross section along the line 4—4 of FIG. 1.

This over-center linkage action 23 includes a lower portion 24 having a bearing sleeve 25 engaging around a pivot pin 26 secured to the arcuately curved lower end 22 and details of this are shown in FIG. 4.

In this embodiment, the pivot pin 26 is welded by the center portion thereof to the curved skid plate portion 22 and the bearing sleeves 25 pivotally engage the ends of this pivot pin.

This lower portion is bifurcated and includes the two spaced and parallel arms 27 extending upwardly one from each of the bearing sleeves 25 and these arms terminate in further bearing sleeves 28 formed on the upper ends thereof.

An upper portion 29 is secured to the rear pivot pin 19 as by welding or the like (not illustrated) and is secured to a lower bearing pin 30 on the lower end thereof, and bearing pin extending into and being bearably supported by the two bearing sleeves 28 at the lower portion 24.

An over-center locking device is provided and comprises a short plate 31 extending from the bearing pin 30 and having transversely extending portions or flanges 32 one upon each side thereof which engages the faces 33 of the bifurcated arms 27 of the lower portion 24 when in the over-center or extended position illustrated in FIGS. 1 and 2 thus supporting the jack stand in the extended position.

Figure 3:
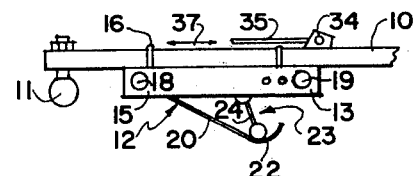
FIG. 3 is a schematic side elevation similar to FIG. 2 but showing the device in the stored or retracted position.

Means are provided to raise and lower the jack stand from the position shown in FIG. 2 to the position shown in FIG. 3 and vice versa and this means takes the form of a lever 34 secured to one end of the rear pivot pin 19.

A rod 35 is supported within a bearing sleeve 36 extending from one side of the mounting plate component 12 and this rod has an angulated rear end 36A pivotally engagable within an aperature formed in the upper end of lever 34. A rod 35 extends forwardly and may either be connected to an automatic trip mechanism (not illustrated) or may be moved manually in the direction of double headed arrow 37.

When it is moved into the position shown in FIGS. 1 and 2, the jack stand is extended with the over-center locking mechanism passing over-center and snapping into the position illustrated.

When it is moved rearwardly to the position shown in FIG. 3, the over-center locking mechanism is broken thus enabling the jack stand to be moved to the retracted or stored position illustrated.

It will be noted that a plurality of apertures 19A is provided so that pin 19 can be engaged within any one of these apertures thus giving limited height adjustment to the jack stand.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim is:

1. A jack stand for attachment to a standard hitch bar comprising in combination a mounting plate component, said component including a channel section having a web and a flange extending at right angles from each side edge of said web, said channel section engaging under said hitch bar with said web on the under side of said hitch bar and said flanges depending downwardly one upon each side of said hitch bar, front and rear pivot pins bearably engaging between said flanges below said hitch bar, a ground engaging skid plate mounted for pivotal action by one end thereof to said front pivot pin, said ground engaging skid plate extending downwardly and rearwardly from said front pivot pin, an over-center locking linkage mounted for pivotal action by one end thereof to said rear pivot pin and by the other end thereof to adjacent the other end of said skid plate, said over-center locking linkage extending upwardly and rearwardly from said lower end of said skid plate towards said rear pivot pin when in the extended position, said over-center locking linkage including a lower portion having a bifurcated upper end, bearing sleeves formed on said upper end, an upper portion, said upper portion, having a bearing pin secured to the lower end thereof and engaging said bearing sleeve, and an over-center linkage stop extending from said bearing pin, said stop having transverse extensions engaging said bifurcated end of said lower portion when in the extended supporting position.

2. A jack stand for attachment to a standard hitch bar comprising in combination a mounting plate component, a ground engaging skid plate pivoted by one end thereof to adjacent one end of said mounting plate component and extending downwardly and rearwardly therefrom, an over-center locking linkage pivoted by one end thereof to adjacent the lower end of said skid plate and by the other end thereof to adjacent the other end of said mounting plate component, said locking linkage extending upwardly and rearwardly from said lower end of said skid plate, towards said mounting plate when in the extended position, and means operatively connected to said locking linkage for making and breaking same thereby moving said stand from an extended, supported position to a retracted storage position and vice versa, said over-center linkage including a lower portion having a bifurcated upper end, bearing sleeves formed on said upper end, an upper portion, said upper portion having a bearing pin secured to the lower end thereof and engaging said bearing sleeves and an over-center locking stop extending from said bearing pin, said stop having transverse extensions engaging said bifurcated ends of said lower portion when in the extended supported position.

3. The stand according to claim 2 in which said mounting plate comprises a length of channel having a web and a pair of spaced and parallel flanges extending one from each side of said web and at right angles thereto, said channel engaging under the associated hitch bar with said flanges extending downwardly upon each side thereof, means to detachably clamp said channel to said hitch bar, said means operatively connected to said over-center locking linkage including a lever operatively connected by one end thereof to the upper end of said linkage and means connected to said lever for pivoting said stand from said extended supporting position to said retracted storage position and vice versa.

* * * * *